Feb. 18, 1941.  J. E. FISHBURN  2,232,106
TICKET CANCELING MACHINE
Filed Aug. 17, 1939
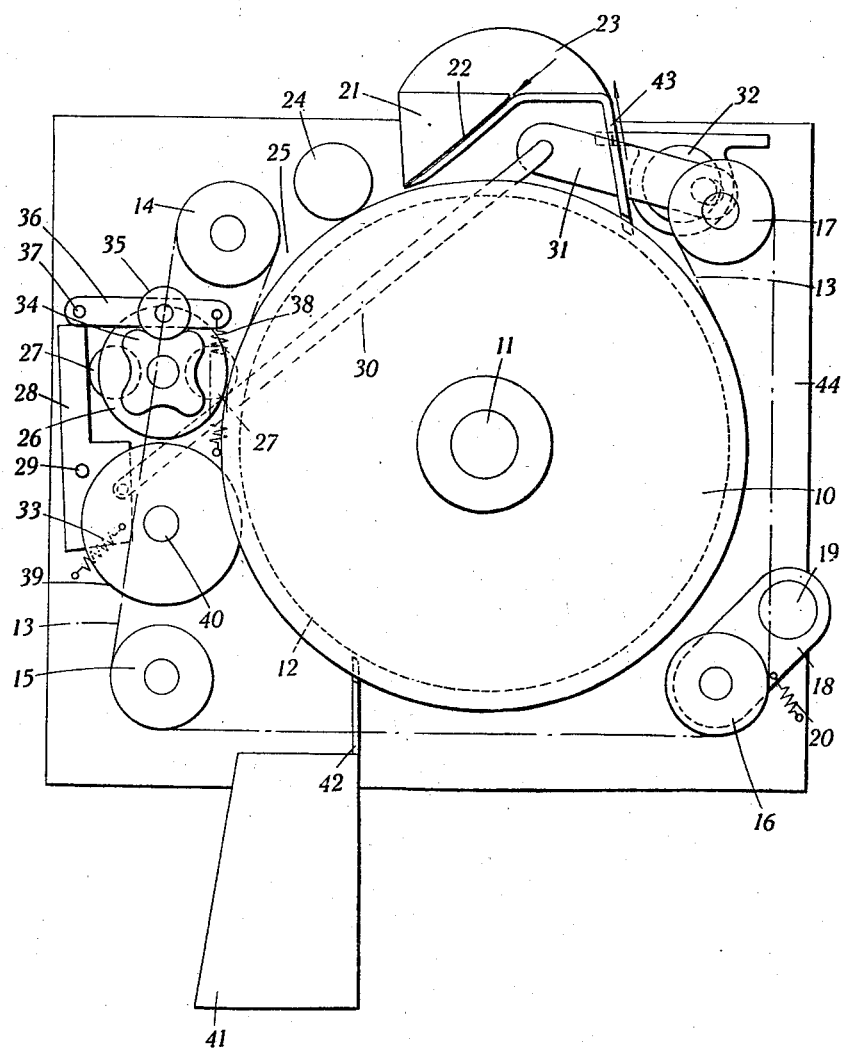
INVENTOR
John Eskdale Fishburn
BY
ATTORNEYS.

Patented Feb. 18, 1941

2,232,106

UNITED STATES PATENT OFFICE 2,232,106

TICKET CANCELING MACHINE

John Eskdale Fishburn, London, England, assignor to Bell Punch Company Limited, London, England, a British company Application August 17, 1939, Serial No. 290,550
In Great Britain August 20, 1938

6 Claims. (Cl. 164—61)

This invention relates to ticket canceling machines and is an improvement in or modification of the ticket canceling machine described and claimed in the specification of copending application Serial No. 211,986.

The invention claimed in the aforesaid application comprises a ticket canceling machine in which a strip of tickets inserted therein is severed longitudinally into at least two sub-strips, at least one of said sub-strips being subsequently ejected from the machine.

The improvement according to the present invention comprises a rotatable drum adapted to feed the ticket strip past mechanism for severing the same longitudinaly into two sub-strips and subsequently to eject one of the said sub-strips from the ticket-canceling machine.

Preferably the drum is associated with an endless band which cooperates with the drum in feeding the ticket strip past the severing mechanism and in ejecting the sub-strip from the machine.

Preferably also the sub-strip is ejected from the machine at a point adjacent that at which the original ticket strip is inserted so that the operation of inserting the ticket strip and removing the sub-strip may be effected without having to move the hand.

The accompanying drawing shows a schematic side elevation with a side plate removed of ticket canceling mechanism constructed in accordance with the present invention.

Referring to the drawing I provide a metal or other drum 10 rotatably mounted on a spindle 11 and positively driven in any suitable manner from an electric motor (not shown). The drum 10 is provided with a peripheral groove 12 extending completely around its circumference for a purpose hereinafter described. Also extending around the greater portion of the periphery of the drum in contact therewith is an endless band or belt 13 mounted to move freely on rotatable guide rollers 14, 15, 16, and 17, the width of the belt 13 being slightly less than half the width of the drum and the belt being arranged to run on the periphery of the drum at one side of the groove 12. In the example shown the belt 13 is arranged at the side of the groove nearer the observer. The belt may be made of any convenient inextensible material, preferably of textile material, and one of the guide rollers is preferably arranged to form a spring-urged jockey roller to take up any slack that may occur after a period of use. In the drawing the guide roller 16 is carried on an arm 18 pivotally mounted at 19 and acted upon by a spring 20 serving to urge the roller 16 in a direction to apply tension to the belt 13.

Situated above the drum is a part 21 shaped to form a slot 22 into the upper end of which can be inserted a ticket or ticket strip. The part 21 is provided at one side with a flange 23 forming a side stop for the ticket strip when the latter is inserted in the slot 22 and the slot 22 is of such a dimension that two superimposed tickets or ticket strips cannot be inserted therein. Adjacent the inner end of the slot 22 and in contact with the portion of the periphery of the drum 10 on the opposite side of the groove 12 to that on which the belt runs is a freely rotatable rubber roller 24, the latter serving to pick up between itself and the drum a ticket or ticket strip inserted in the slot 22 and advance it into the converging mouthpiece 25 formed by the belt and the drum.

Adjacent the guide roller 14 is a freely rotatable serrated counter operating wheel 26, the latter being spaced a distance from the drum 10 of approximately half a ticket thickness and having its circumference equal to two ticket lengths. The wheel 26 is arranged on the same side of the groove 12 as the roller 24 and hence after the inserted ticket strip has been picked up at one side between the belt 13 and the drum 10 it will be advanced to the wheel 26 and whilst moving past the latter will rotate the same, a half revolution for each ticket passing the wheel. Carried on the wheel 26 and arranged at diametrically opposite points thereon is a pair of rollers 27, the latter during rotation of the counter operating wheel serving alternately to engage and move a lever 28 pivotally mounted at 29 and connected by a link 30 with an arm 31 secured to the shaft of a counter 32. The lever 28 is associated with a spring 33 serving to urge the lever 28 in a direction towards the rollers 27 and hence on each half revolution of the wheel 26 corresponding to the passage of one ticket the counter 32 will be advanced by one digit.

The counter operating wheel is associated with a compensating device for adjusting the position of the wheel in the event of slip between the ticket and the wheel or by reason of the length of the ticket varying and not being exactly equal to half the circumference of the wheel. In the example shown the wheel is associated with a four-lobed cam wheel 34 with which engages a roller 35 carried on a lever 36 pivoted at 37 and subjected to the action of a spring 38. The drawing shows the parts of the mechanism in the rest position and when a ticket passes the wheel 26 the roller 27 shown in engagement with the lever 28 releases the latter, the lever being subsequently restored to its initial position by the other roller 27 and serving to advance the counter 32 on such restoration.

In the event of slip between the ticket and the wheel or variation in the length of the tickets the wheel 26 will not be rotated exactly through a half revolution or passage of a ticket but as soon as the ticket or ticket strip has passed the wheel the latter will be moved into its correct position by reason of the roller 35 moving into the bottom of the appropriate depression between the lobes of the cam wheel 34. This adjustment of the counter operating wheel will take place whether the wheel receives a slight overfeed or underfeed.

After leaving the counter operating wheel 26 the ticket strip passes to a cutting wheel 39, the latter being freely rotatable on a spindle 40 and arranged to project into the groove 12 in the drum. The cutting wheel 39 serves to sever the ticket strip longitudinally down its centre line as the strip is fed past the wheel by the belt and the portion of the strip not held between the belt 13 and the drum falls into a receptable 41. A stripper 42 formed integrally with the receptacle 41 may be provided for assisting in removing the severed strip from the drum although usually such a stripper is not necessary.

The portion of the ticket strip held between the belt and the drum, after severance of the remaining part of the ticket strip therefrom, is carried round the drum until it meets a baffle 43, the latter being arranged as shown adjacent the point where the belt leaves the drum. This baffle can conveniently be formed integrally with the part 21 and serves to direct the ticket through an aperture, which normally can be closed by a flap, in a cover plate (not shown) from which aperture it can be removed by hand. The distance between the aperture aforesaid and the point where the belt leaves the drum is arranged to be less than a ticket length so that the upper end of the ticket will remain in a position where it can be removed by hand. It will be noted that the point of ejection of the ticket or ticket strip, is situated near the point of insertion thereof and such an arrangement enables the attendant to insert the ticket strip and remove the substrip without moving his hand any appreciable amount.

The parts of the mechanism above described are contained between a pair of side plates 44 (one of the said plates being removed in the drawing) so as to form a unit which can be located in any suitable casework. Also the side plates serve to prevent the ticket strip and the severed strip wandering off the drum during feed thereof through the machine.

The invention is not limited to the example described as subordinate details of construction can be varied to suit different requirements.

I claim:

1. A ticket canceling machine comprising a casing, means providing an opening in the casing for insertion of a ticket, severing means for separating into portions each ticket inserted into the machine, means providing an opening in the casing for the delivery of one portion of each ticket, means for guiding a ticket from the first opening to the severing means and for guiding therefrom a portion of the ticket to the second opening, and means for guiding the other portion of the ticket away from the second opening, the first mentioned guiding means comprising a drum with the periphery of which first the ticket and then the first mentioned portion moves, and means for holding the ticket and that portion in engagement with the drum.

2. A ticket canceling machine comprising a casing, means providing an opening in the casing for insertion of a ticket, severing means for separating into portions each ticket inserted into the machine, means providing an opening in the casing for the delivery of one portion of each ticket, means for guiding a ticket from the first opening to the severing means and for guiding therefrom a portion of the ticket to the second opening, and means for guiding the other portion of the ticket away from the second opening, the first mentioned guiding means comprising a drum with the periphery of which first the ticket and then the first mentioned portion moves, and means for holding the ticket and that portion in engagement with the drum, the holding means comprising an endless band forming a loop with its outer surface in engagement with the drum.

3. A ticket canceling machine comprising a casing, means providing an opening in the casing for insertion of a ticket, severing means for separating into portions each ticket inserted into the machine, means providing an opening in the casing for the delivery of one portion of each ticket, said openings being closely adjacent each other, and means for guiding a ticket from the first opening to the severing means and for guiding therefrom a portion of the ticket to the second opening.

4. A ticket canceling machine comprising a casing, means providing an opening in the casing for insertion of a ticket, severing means for separating into portions each ticket inserted into the machine, means providing an opening in the casing for the delivery of one portion of each ticket, and means for guiding a ticket from the first opening to the severing means and for guiding therefrom a portion of the ticket to the second opening, said guiding means comprising a drum with the periphery of which first the ticket and then said portion moves, and means for holding the ticket and said portion in engagement with the drum through more than half the circular path of the periphery thereof.

5. A ticket canceling machine comprising a casing, means providing a slit in the casing for insertion of a ticket, said slit having a width less than twice the thickness of a ticket to be handled to prevent the simultaneous insertion of two tickets in overlapping relationship, severing means for separating into portions each ticket inserted into the machine, means providing an opening in the casing for the delivery of one portion of each ticket, and means for guiding a ticket from the slit to the severing means and for guiding therefrom a portion of the ticket to the delivery opening.

6. A ticket canceling machine comprising in combination, a rotatable drum, a belt arranged to feed a ticket between itself and the drum around at least 90° of the latter, severing means for severing the ticket longitudinally into at least two portions during feed of said ticket around the drum, said belt and drum co-operating to advance at least one of the said portions to an ejection point in the machine, and means for diverting at least one of said portions from the region of engagement of the last mentioned portion by said belt and down and away from said ejection point.

JOHN ESKDALE FISHBURN.